(12) United States Patent
Frazier et al.

(10) Patent No.: US 8,514,999 B2
(45) Date of Patent: Aug. 20, 2013

(54) FLOATING-POINT EVENT COUNTERS WITH AUTOMATIC PRESCALING

(75) Inventors: Giles R. Frazier, Austin, TX (US); Venkat R. Indukuru, Austin, TX (US); Alexander E. Mericas, Austin, TX (US); John F. Spannaus, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/312,715

(22) Filed: Dec. 6, 2011

(65) Prior Publication Data
US 2013/0142301 A1 Jun. 6, 2013

(51) Int. Cl.
*H03K 23/00* (2006.01)
(52) U.S. Cl.
USPC .................................. 377/33; 377/15; 377/52
(58) Field of Classification Search
USPC .......................................... 377/15, 33, 39, 52
See application file for complete search history.

(56) References Cited

U.S. PATENT DOCUMENTS

| | | | | |
|---|---|---|---|---|
| 3,866,024 A | * | 2/1975 | Williams | 377/44 |
| 4,005,364 A | | 1/1977 | Harrington | |
| 4,099,048 A | * | 7/1978 | Eichenlaub | 377/54 |
| 4,475,085 A | * | 10/1984 | Yahata et al. | 327/160 |
| 4,477,920 A | * | 10/1984 | Nygaard, Jr. | 377/52 |
| 5,412,580 A | * | 5/1995 | Fulcomer et al. | 716/136 |
| 5,903,521 A | * | 5/1999 | Relph | 368/113 |
| 6,066,990 A | | 5/2000 | Genest | |
| 6,088,421 A | * | 7/2000 | Rao et al. | 377/44 |
| 6,115,439 A | | 9/2000 | Andresen et al. | |
| 6,263,450 B1 | * | 7/2001 | Predko | 713/502 |
| 6,820,103 B2 | | 11/2004 | Butler et al. | |
| 6,873,670 B1 | | 3/2005 | Chiu | |
| 6,937,105 B2 | | 8/2005 | Mallinson | |
| 6,959,404 B2 | | 10/2005 | Hirakawa et al. | |
| 7,023,251 B2 | | 4/2006 | Starr | |
| 7,501,845 B2 | | 3/2009 | Muniandy et al. | |
| 8,212,704 B2 | * | 7/2012 | Anastasov et al. | 341/152 |
| 2005/0165569 A1 | | 7/2005 | Matsui | |
| 2010/0122002 A1 | | 5/2010 | Lory et al. | |
| 2011/0304487 A1 | | 12/2011 | Anastasov et al. | |

FOREIGN PATENT DOCUMENTS

DE 2559261 7/1977
JP 60095382 5/1985

* cited by examiner

*Primary Examiner* — William Hernandez
(74) *Attorney, Agent, or Firm* — Matthew W. Baca; Jack V. Musgrove

(57) ABSTRACT

Occurrences of a particular event in an electronic device are counted by incrementing an event counter each time a variable number of the particular events have occurred, and automatically increasing that variable number as the total count increases. The variable number (prescale value) can increase geometrically according to a programmable counter base each time the count mantissa overflows. The event counter thereby provides hardware-implemented automatic prescaling while significantly reducing the number of interface bits required to support very large count ranges, and retaining high accuracy at very large event counts.

21 Claims, 5 Drawing Sheets

FLOATING-POINT EVENT COUNTERS WITH AUTOMATIC PRESCALING

BACKGROUND OF THE INVENTION

1. Field of the Invention

The present invention generally relates to computer systems, and more particularly to a method of counting event occurrences in a computer system for performance monitoring.

2. Description of the Related Art

As electronic systems become more complicated, there is a greater need for monitoring the performance of the systems to ensure optimum operation and identify any defects or design problems. This concern is particularly important for integrated circuits such as processors used in computer systems. An exemplary processor 10 is illustrated in FIG. 1, and includes various execution units, registers, buffers, memories, and other functional units which are all formed by integrated circuitry. Processor 10 is coupled to a system or fabric bus 12 via a bus interface unit (BIU) 14 within processor 10 which controls the transfer of information between processor 10 and other devices coupled to system bus 12, such as a main memory. BIU 14 is connected to an instruction cache and memory management unit (MMU) 16, and to a data cache and MMU 18. High-speed caches, such as those within instruction cache and MMU 16 and data cache and MMU 18, enable processor 40 to achieve relatively fast access time to a subset of data or instructions previously transferred from main memory to the caches, thus improving the speed of operation of the host data processing system. Instruction cache and MMU 16 is further coupled to a sequential fetcher 20, which fetches instructions for execution from instruction cache and MMU 16 during each cycle. Sequential fetcher 20 transmits branch instructions fetched from instruction cache and MMU 16 to a branch prediction unit 22 for calculating the next instruction fetch address, but temporarily stores sequential instructions within an instruction queue 24 for execution by other execution circuitry within processor 10. The execution circuitry of processor 10 has multiple execution units for executing sequential instructions, including one or more fixed-point units (FXUs) 26, load-store units (LSUs) 28, floating-point units (FPUs) 30, and branch processing units (BPUs) 32. These execution units 26, 28, 30, and 32 execute one or more instructions of a particular type during each processor cycle, utilizing source operands received from specified general purpose registers (GPRs) 34 or GPR rename buffers 36, or from floating-point registers (FPRs) 38 or FPR rename buffers 40.

Today's processors typically provide performance monitoring counters that count the time, cycles, or other types of events between a first event and a second event. For example, if latency is to be measured, the counted events are typically cycles, and typical start and stop events might be instruction fetch and instruction completion, load fetch and load completion, or cache miss and cache reload. Alternatively, if the reason for a large cache reload latency is being investigated, typical start and stop events might be cache load and cache reload, and the counted events might be load retries in the fabric, or some action that is performed in order to reload the cache.

In addition to counting events between a start and a stop event, it is often desirable to see if the number of counted events exceeds a given threshold, or to measure how frequently the number of counted events exceeds the threshold. In order to provide this additional functionality, the hardware can support a threshold register which contains the value against which the total number of counted events is to be compared.

SUMMARY OF THE INVENTION

The present invention is directed to a method of counting events in an electronic device, by receiving a signal which indicates when a particular event of the electronic device occurs, incrementing an event counter each time a variable number of the particular events have occurred, and automatically increasing that variable number as the total count of the particular events increases. In the illustrative embodiment, control logic increments a count mantissa of the event counter, and the variable number increases geometrically each time the count mantissa overflows. The event counter can also include a count exponent which is incremented each time the count mantissa overflows, and the variable number is a prescale value which is equal to a counter base raised to a power of a current value of the count exponent. For example, the event counter could have a 3-bit exponent, a 7-bit mantissa, and use a counter base of 4. The counter base can be programmably set by a software performance monitor. The control logic can further set the count mantissa to a transitional value each time the count mantissa overflows, wherein the transitional value is equal to an overflow value for the count mantissa divided by the counter base. The software performance monitor can select the particular event to be counted, a start event which resets the counter, and an end event which stops counting. The software performance monitor can also define a threshold value and monitor when the threshold value is exceeded by the current value of the event counter.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
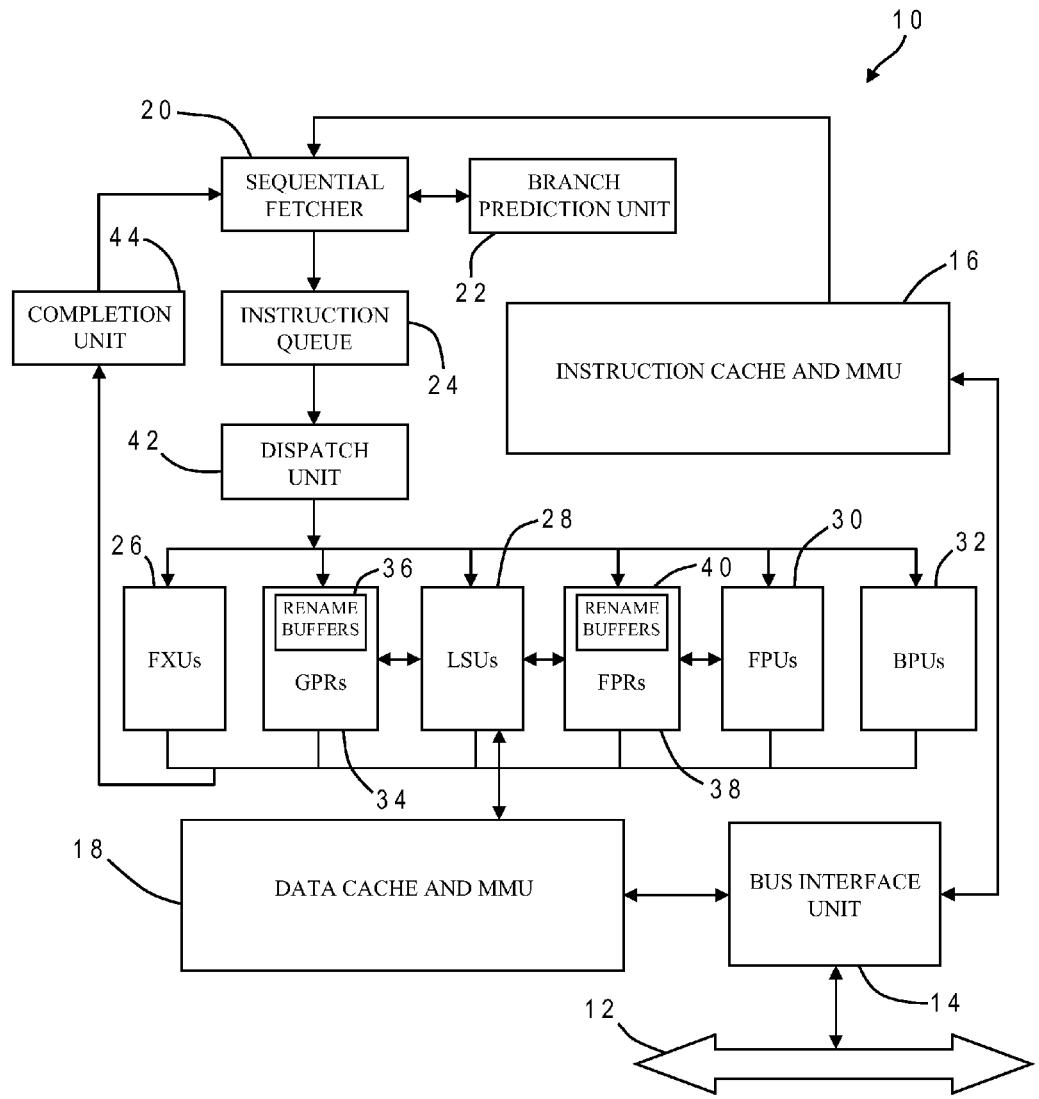
FIG. 1 is a block diagram of a conventional microprocessor for a computer system which experiences various events that are to be counted by a performance monitor.

Due to the complexity of today's processors, there is a large number of different types of events that can be counted, as well as a large number of different possible start and stop events that need to be specified. Accordingly, the typical numbers of counted events between start and stop events for a complex computer system can vary over a huge range. For example, some pairs of start and stop events may be separated by only a few counted events, whereas other pairs of events may be separated by a million or more counted events. This count variability requires the event counter register and any threshold register to contain a large number of bits, introducing significant hardware cost and additional power consumption. This construction also increases the time it takes a supervisor program to save and restore counter context when a software program running on the computer system is swapped in and out of processing. These problems are further exacerbated when multiple sets of counters are provided by the hardware, as is often done with modern processors.

In order to reduce the magnitude of this problem, some counter implementations decrease the number of register bits supported and enable software to prescale the counter, by configuring the counter to count every n counted events instead of every single counted event. However, this requires software to first determine an appropriate prescale value n. Determining this value often requires setting n to a small value, conducting a test to determine if the counter overflows, and then repeating the test as many times as necessary with increasing values of n until the counter does not overflow and the proper scaling factor is discovered. This process is time-consuming, and the time spent affects how the multiple sets of start and stop events are to be analyzed, since they are separated by unknown numbers of counted events.

It would, therefore, be desirable to devise an improved method of counting events in an electronic device which could use a decreased number of hardware counter bits while still providing for a large range in possible count values. It would be further advantageous if the method could eliminate the need for software to determine a prescale value. The present invention achieves these objects by automatically prescaling the rate of counting to adapt to the number of events observed. While the counter is not 100% accurate at large count values, it can maintain a very high and constant percentage accuracy by automatically increasing the prescale value geometrically each time the total count reaches a particular value.

In the exemplary embodiment described further below, a floating-point numerical format is used for the counter so that the conversion and deconversion of the floating-point value to an actual count is simplified for software. The counter format is a base B floating-point number with an n-bit exponent and m-bit mantissa. The number of bits required for this counter is thus n+m, and number of counts supported is $2^m \times B^{2^n-1}$. For example, a 10-bit base-4 floating-point counter with m=7 and n=3 can support $2^7 \times 4^7$ counts (over 2 million), whereas a binary 10-bit counter can support only 1024 counts. The operation of the counter of the present invention involves increasing the prescale value by a factor of the floating-point base each time the mantissa overflows. For this example, each time the mantissa overflows (at binary count 127), the prescale value is increased by a factor of 4. This implementation results in a maximum counting value inaccuracy 4/128 (3.1%) since the mantissa does not increment after count 128 until the count is 128+4=132, and this accuracy value maintains constant at factors of the prescale value. If greater accuracy is required, a larger number of mantissa bits or a smaller floating-point base can be chosen but for most applications, including typical performance monitoring applications, a base of 4 with a 3.1% accuracy is likely more than sufficient.

In many situations there will be no need to count beyond the range in which the counter increments by 1 (i.e., the binary mantissa value, or 128 in this example), and within this range there is no inaccuracy in the count.

Figure 2:
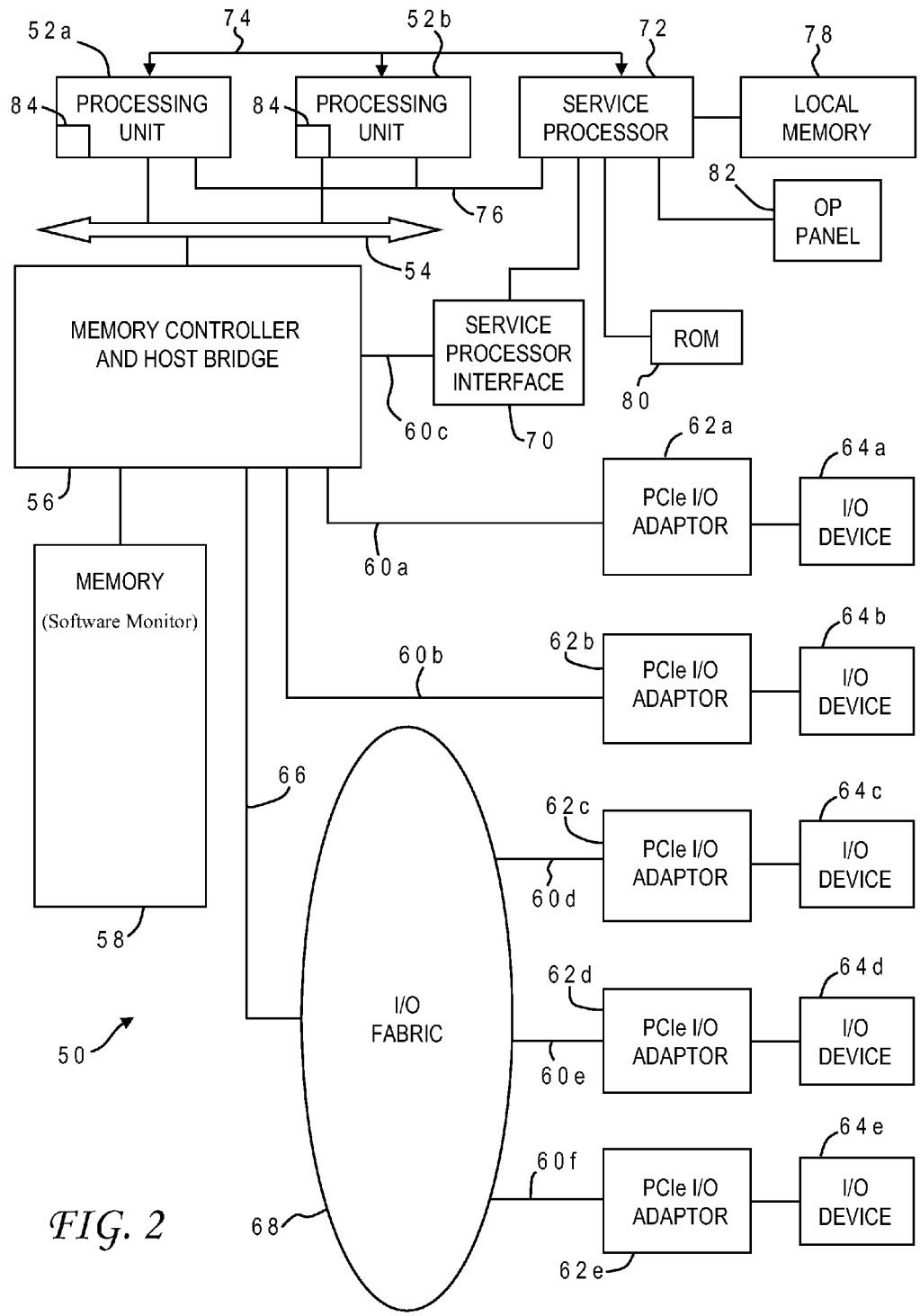
FIG. 2 is a block diagram of a computer system programmed to carry out performance monitoring including control of hardware event counters in accordance with one implementation of the present invention.

With reference now to the figures, and in particular with reference to FIG. 2, there is depicted one embodiment 50 of a computer system in which a software performance monitor may be implemented to count various events occurring within integrated circuit devices of the computer system in accordance with the present invention. Computer system 50 is a symmetric multiprocessor (SMP) system having a plurality of processors 52a, 52b connected to a system bus 54. System bus 54 is further connected to a combined memory controller/host bridge (MC/HB) 56 which provides an interface to system memory 58. System memory 58 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 56 also has an interface to peripheral component interconnect (PCI) Express links 60a, 60b, 60c. Each PCI Express (PCIe) link 60a, 60b is connected to a respective PCIe adaptor 62a, 62b, and each PCIe adaptor 62a, 62b is connected to a respective input/output (I/O) device 64a, 64b. MC/HB 56 may additionally have an interface to an I/O bus 66 which is connected to a switch (I/O fabric) 68. Switch 68 provides a fan-out for the I/O bus to a plurality of PCI links 60d, 60e, 60f. These PCI links are connected to more PCIe adaptors 62c, 62d, 62e which in turn support more I/O devices 64c, 64d, 64e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 56 provides a low latency path through which processors 52a, 52b may access PCI devices mapped anywhere within bus memory or I/O address spaces. MC/HB 56 further provides a high bandwidth path to allow the PCI devices to access memory 58. Switch 68 may provide peer-to-peer communications between different endpoints and this data traffic does not need to be forwarded to MC/HB 56 if it does not involve cache-coherent memory transfers. Switch 68 is shown as a separate logical component but it could be integrated into MC/HB 56.

In this embodiment, PCI link 60c connects MC/HB 56 to a service processor interface 70 to allow communications between I/O device 64a and a service processor 72. Service processor 72 is connected to processors 52a, 52b via a JTAG interface 74, and uses an attention line 76 which interrupts the operation of processors 52a, 52b. Service processor 72 may have its own local memory 78, and is connected to read-only memory (ROM) 80 which stores various program instructions for system startup. Service processor 72 may also have access to a hardware operator panel 82 to provide system status and diagnostic information.

In alternative embodiments computer system 50 may include modifications of these hardware components or their interconnections, or additional components, so the depicted example should not be construed as implying any architectural limitations with respect to the present invention. The invention may further be implemented in an equivalent cloud computing network.

When computer system 50 is initially powered up, service processor 72 uses JTAG interface 74 to interrogate the system (host) processors 52a, 52b and MC/HB 56.

After completing the interrogation, service processor 72 acquires an inventory and topology for computer system 50. Service processor 72 then executes various tests such as built-in-self-tests (BISTs), basic assurance tests (BATs), and memory tests on the components of computer system 50. Any error information for failures detected during the testing is reported by service processor 72 to operator panel 82. If a valid configuration of system resources is still possible after taking out any components found to be faulty during the testing then computer system 50 is allowed to proceed. Executable code is loaded into memory 58 and service processor 72 releases host processors 52a, 52b for execution of the program code, e.g., an operating system (OS) which is used to launch applications and in particular a software performance monitor in accordance with the present invention, results of which may be stored in a hard disk drive of the system (an I/O device 64). While host processors 52a, 52b are executing program code, service processor 72 may enter a mode of monitoring and reporting any operating parameters or errors, such as the cooling fan speed and operation, thermal sensors, power supply regulators, and recoverable and non-recoverable errors reported by any of processors 52a, 52b, memory 58, and MC/HB 56. Service processor 72 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 50 carries out program instructions for a software performance monitor that can include control features for hardware event counters distributed throughout the system. Accordingly, a program embodying the invention may include conventional aspects of various performance monitoring tools, and these details will become apparent to those skilled in the art upon reference to this disclosure. In this example, hardware event counters 84 are illustrated as being included with processors 52*a*, 52*b*, that is, a given hardware counter is constructed on the same integrated circuit semiconductor substrate as its respective processor. However, other hardware counters could be used for any integrated circuit device of computer system 10 and the counters do not necessarily need to be located on the same device, so this example should not be construed in a limiting sense. A single processor or other semiconductor device could also include more than one counter.

Figure 3:
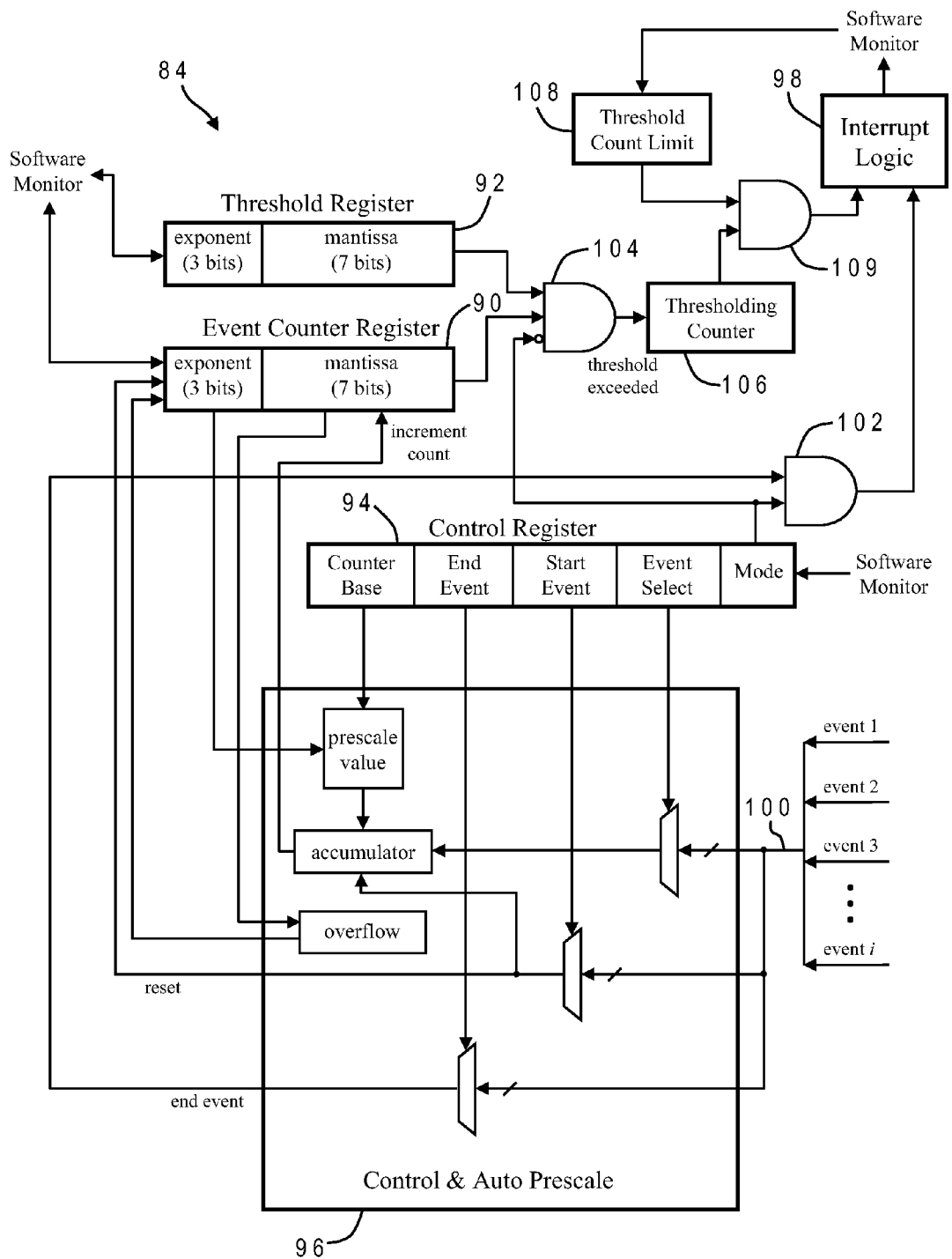
FIG. 3 is a high-level schematic diagram of one embodiment of a floating-point hardware event counter with automatic prescaling constructed in accordance with the present invention.

Referring now to FIG. 3, there is depicted in schematic form one embodiment of a floating-point hardware event counter 84 constructed in accordance with the present invention. For this embodiment the goal of counter 84 is to count how many times a particular event occurs (the "counted" event) from the time when one event happens (the "start" event) until another event happens (the "end" event) without any intervening start event, i.e., the counter is reset to zero each time the start event occurs. The types of events to be counted (or used as start and end events) are not limited but the counted, start and end events are usually different, and can be any detectable event of the integrated circuit device. Counter 84 is generally comprised of a plurality of electrical circuits including an event counter register 90, a threshold register 92, a control register 94, control and auto prescale logic 96, thresholding counter 106, threshold count limit register 108, and interrupt logic 98. In the exemplary implementation numbers are represented by the counter in base-4 ("quaternary") floating-point format, but any base could be chosen by the designer.

Event counter register 90 keeps track of the current event count (i.e., the number of counted events since the last start event), and includes three exponent bits and seven mantissa bits for a count range of zero to over two million using base 4. Threshold register 92 likewise has three exponent bits and seven mantissa bits to represent a threshold value in floating-point format using the same base as event counter register 90. Control register 94 contains various fields that control the counter operation, including a Counter Base field, a Start Event field, an End Event field, an Event Select field, and a Mode field. The Counter Base field is a 2-bit field specifying directly or indirectly the base to be used for the floating-point conversion (in this example, 4). The Start Event field is a 4-bit field specifying the event at which the counter begins counting. The End Event field is a 4-bit field specifying the event at which the counter stops counting. The Event Select field is a 4-bit field specifying the event to be counted. In some implementations certain events that might be used for start and stop events might never be used as counted events so the number of different possible counted events may be smaller and the Event Select field may accordingly use fewer bits. The Mode field is a single bit indicating whether a basic counting operation is to be performed or whether the thresholding function is to be invoked. Each of the event counter, threshold, thresholding counter, threshold count limit, and control registers are software-accessible, i.e., they are readable or writable by the software performance monitor as appropriate utilizing a customized instruction set adapted for processors 52*a*, 52*b*.

To initiate measurement, the software monitor sets the counter base, start event, end event, and the counted event in the control register according to the testing desired, and enables the counter logic by initializing event counter register 90 to zero whereupon control and auto prescale logic 96 is configured to divide the count by 1 (i.e., count every specified event). Prescaling circuitry within control and auto prescale logic 96 computes the prescale value using the input counter base from control register 94 and the current counter exponent bits from event counter register 90. If the thresholding function is a desired part of the testing then the predetermined threshold value is also set in threshold register 92, and the threshold mode bit in control register 90 is set to 1 (otherwise the threshold mode bit is set to 0). Those skilled in the art will appreciate that an event counter constructed in accordance with the present invention may be utilized for a simple counting operation without implementing the thresholding function, in which case threshold register 92 need not be set.

Counter 84 then waits for the starting event to occur, that is, control and auto prescale logic 96 does not begin to increment event counter register 90 until activated by the start event signal. The various event signals designed into the system may be collected on an event bus 100 which is an input to several internal multiplexers of control and auto prescale logic 96. One of the multiplexers is controlled by the identifier in the start event field of control register 94, and passes the start signal to reset event counter register 90 and to notify the internal accumulator of control and auto prescale logic 96 that counting may begin. A second multiplexer is controlled by the identifier in the event select field of control register 94 and passes the event signal to the accumulator. When the accumulator has detected a number of counted events (active event signals) which equals the prescale value, it increments the mantissa portion of event counter register 90. A third multiplexer is controlled by the identifier in the end event field of control register 94. If the threshold mode bit is 0, indicating that thresholding is not being performed, this multiplexer passes a signal to the interrupt logic 98 when the end event signal is active (via AND gate 102), whereupon an interrupt occurs and counting stops. The software monitor may then examine the current count contained in event counter register 90 and perform any necessary analysis, which may include logging the data obtained and repeating the process with different control register values. The actual number of counts can be computed using the value read from event counter register 90 by shifting the mantissa left a number of places equal to twice the counter exponent value. This simple conversion process is enables software to obtain the floating-point count value with negligible overhead. Of course, if the number of counted events is less than 127, there is no need for any conversion and the count value represented in the counter is the exact number of events that occurred.

During the counting phase, since the prescale logic was initialized to count by 1, every event is counted up to 127 events, whereupon the counter mantissa overflows. Overflow circuitry within control and auto prescale logic 96 detects the mantissa overflow, and takes two responsive actions. First, the exponent portion of event counter register 90 is incremented. Second, the mantissa portion of event counter register 90 is set to a transitional value which is equal to the floating-point equivalent of the overflow value, considering the new exponent value. For this example wherein there are seven mantissa bits the overflow value is 128, so when the counter base is 4 the counter mantissa is reset to binary 0100000 (32 in base 10), corresponding to a floating-point value of 128 ($32 \times 4^1$). More generally, the transitional value is equal to the mantissa overflow value divided by the base, i.e., $2^m/B$.

The prescale circuitry within control and auto prescale logic 96 then automatically recomputes the prescale value using the new counter exponent value, and the accumulator will thereafter increment the counter mantissa only when the number of counted events equals the new prescale value. Counting using the new prescale value continues until the mantissa overflows again at which time the foregoing steps are iteratively repeated, i.e., the exponent is incremented, the mantissa is set to the transitional value, and the prescale value is recomputed. Table 1 shows the prescale values and ranges of event counts corresponding to each value of the counter exponent for the illustrative implementation in base 4.

TABLE 1

| Exponent | Events Per Count (Prescale Value) | Minimum Event Number | Maximum Event Number |
|---|---|---|---|
| 0 | 1 | 0 | 127 |
| 1 | 4 | 128 | 508 |
| 2 | 16 | 512 | 2,032 |
| 3 | 64 | 2,048 | 7,936 |
| 4 | 256 | 8,192 | 32,512 |
| 5 | 1,024 | 32,768 | 130,048 |
| 6 | 4,096 | 131,072 | 522,240 |
| 7 | 16,384 | 524,288 | 2,093,056 |

Those skilled in the art will appreciate that when this counter is using its maximum exponent and is incrementing only once per every 16,384 events, the actual number of events corresponding to this value of the counter is within 16,384 of 524,288 or approximately 3.1%. This constant 3.1% accuracy is maintained throughout all counting values. For most applications, including computer performance monitoring applications, results that are within such a small percentage accuracy are adequate to analyze most problems. Accuracies within, for example, 10 counts for total count values of 100,000 are very seldom needed.

If threshold testing is also desired, the software monitor writes "1" to the mode bit in control register 94 to indicate that the thresholding function is to be performed, and defines the threshold number of events to signal an excess number of event occurrences, e.g., 50, 100, 256, 512, 1024, etc., and writes this number to threshold register 92. If the threshold value to be written exceeds the maximum value of the mantissa, the threshold value N can be converted to the floating-point format of registers 90, 92 using the simple technique of shifting the numeric value for N to the right by two places, and incrementing the threshold exponent by 1 until all but the seven least-significant bits of N are zeros. The threshold mantissa is then set to those seven least-significant bits. A comparator 104 checks each cycle to see if the value in event counter register 90 is equal to the value in threshold register 92, and activates a "threshold exceeded" signal when the thresholding function is being performed. This signal is transmitted to a thresholding counter 106 which keeps track of the number of times the threshold has been exceeded. The value in thresholding counter 106 is compared to the threshold count limit 108 via another comparator 109 which sends an interrupt signal to interrupt logic 98 once the threshold count limit equals the number of times the threshold has been exceeded. When this interrupt signal occurs, the value in event counter register 90 continues to count until the end event occurs, and thus will contain the number of counted events that occurred between the start and stop events. This information may be used by the software monitor to determine the actual amount by which the threshold was exceeded after the threshold value was reached at the time of the interrupt.

There are multiple variations of the foregoing counter that could be implemented according to the designer's needs. To vary the accuracy, either the floating-point base or the number of bits in the mantissa can be adjusted. The range of counts can also be varied by changing the number of bits in the exponent. In this manner, the counter can be tailored to a wide assortment of applications to provide any desired counting range with any desired accuracy. These variations can either be preconfigured into the design, or specifiable by software.

Another feature that can be added to the counter is the provision of events that specify various thresholds. For example, occurrences such as "32_countable_events occurred," "64_countable_events occurred," or "16,000_countable_events occurred" can be provided. Software can then configure another counter to count these occurrences, and interrupt when that count becomes excessive. A basic performance register counter can be used for counting these occurrences. This feature enables software to obtain a rough idea of the range of countable events between a start and stop event. If needed, the threshold counter can be used to specify a more accurate threshold. Some implementations may provide for a large number of such events, which eliminates the need for any threshold register.

In implementations supporting multiple counters, the reduction in the number of bits required per counter enables two or more counters to fit within a single register. This cuts the number of registers required to support the same number of counters by a factor of 2, thereby decreasing save/restore time for switching out the event counter, threshold and control registers. This is a significant advantage in cloud computing and other environments in which program context is changed frequently.

An additional enhancement is to provide "counter read" or "threshold write" instructions that rely on circuitry to automatically convert a binary number into the appropriate counter value. This is not expected to be necessary since the conversion operations outlined above are very simple, but it might be useful in some applications to provide simple hardware for these functions.

Figure 4:
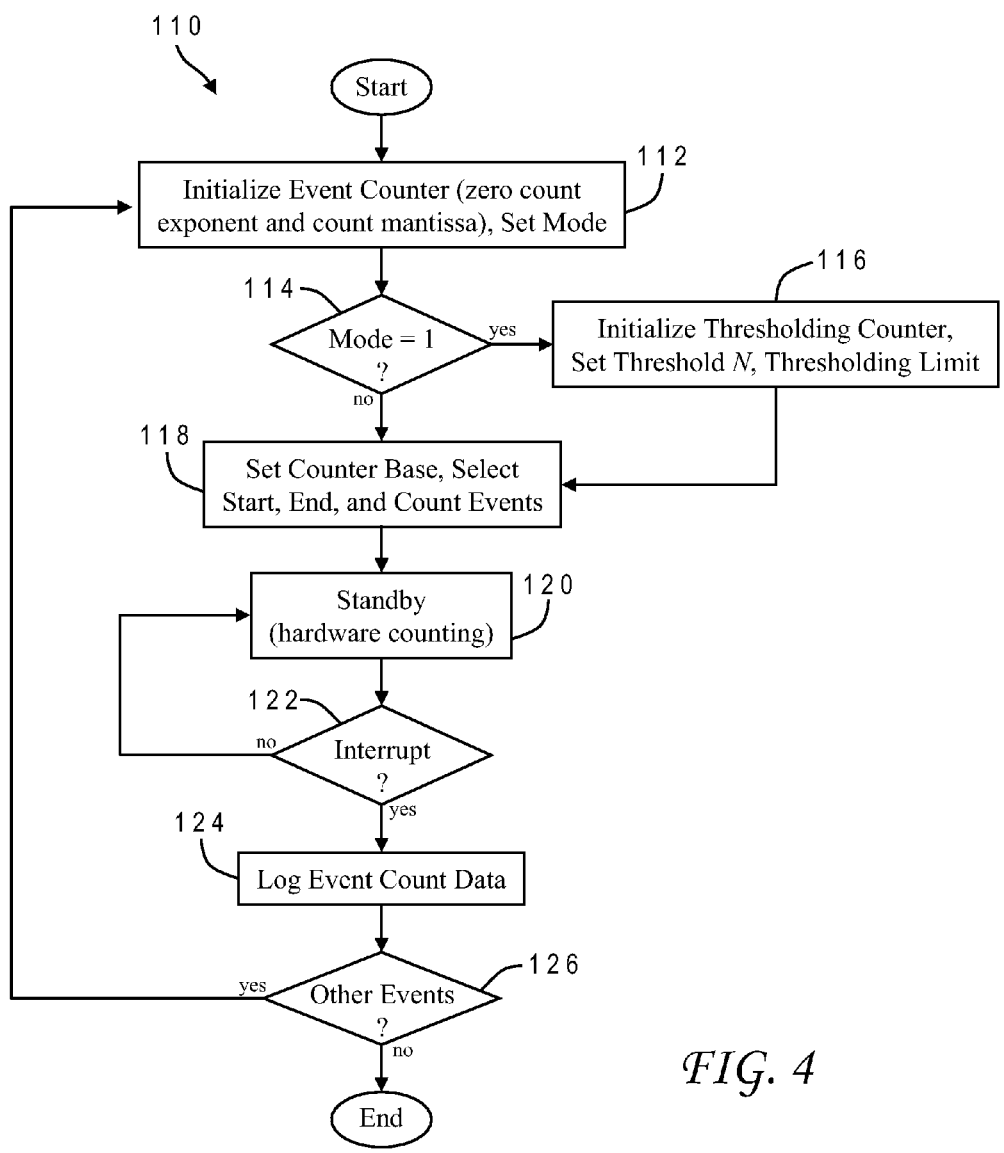
FIG. 4 is a chart illustrating the logical flow for software control of the hardware event counter of FIG. 3 in accordance with one implementation of the present invention.

The invention may be further understood with reference to the chart of FIG. 4 which illustrates the software control process 110 for the exemplary implementation. Process 110 begins when the software monitor initializes the event counter to zero, and sets the threshold mode to indicate whether or not thresholding is to be performed (112). If thresholding is being performed (114), it also initializes thresholding counter 106 to zero, sets the threshold value N, and sets the thresholding limit, i.e., the number of times the threshold may be exceeded before an interrupt occurs (116). The software monitor also sets the counter base and selects the start, end and count events (118). The software monitor then enters a standby mode (120) until it is interrupted by the hardware (122), when one of the following is done depending on whether the thresholding function is being performed. If thresholding function is not being performed, software reads the event counter register to determine the number of counted events that have occurred between the start and end events, logs the data (124), and performs any necessary analysis. If thresholding is being performed, then the occurrence of the interrupt indicates that the number of counted events between the start and stop events has exceeded the threshold limit a number of times equal to the thresholding limit 108. The software monitor may log this information for use in later analysis. The software monitor can then repeat the process for other events, other counter base values, different threshold values, or different threshold count limit values as desired (126).

Figure 5:
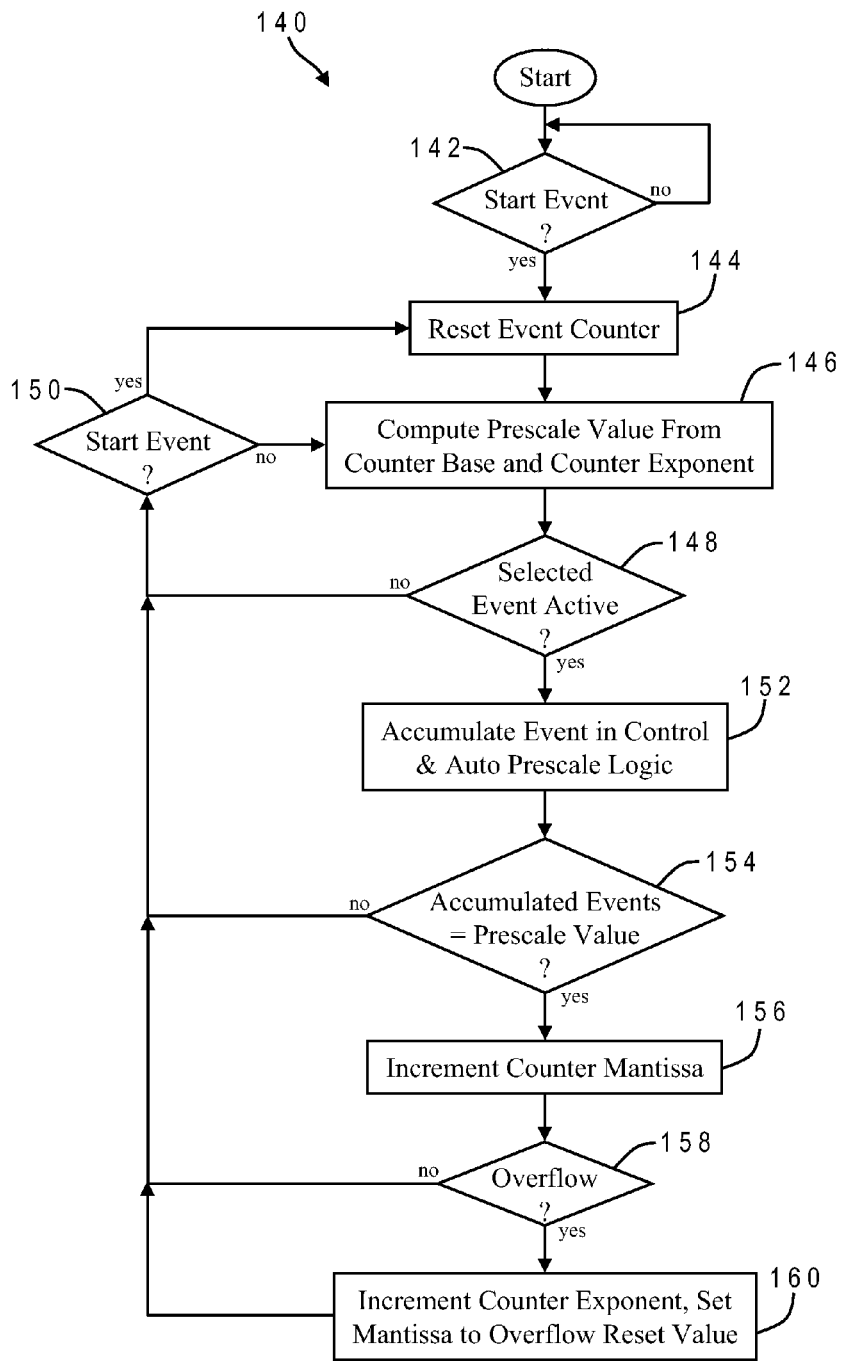
FIG. 5 is a chart illustrating the logical flow for the ongoing counting process carried out by the hardware event counter of FIG. 3 in accordance with one implementation of the present invention.

FIG. 5 illustrates the ongoing hardware process 140 for counting the events. Process 140 begins by checking for an occurrence of the start event (142). Once the start event occurs, the event counter is reset (144), and the prescale value is computed using the counter base and counter exponent (146). The status of the selected event signal is then checked (148). If the selected event signal is not active, the process iteratively checks for the start event each cycle (150) and resets the event counter anytime a start event has occurred (144); otherwise, the counting continues at box 146. If the selected event signal is active, the event is accumulated by the control and auto prescale logic (152). Once the number of accumulated events equals the prescale value (154), the counter mantissa is incremented (156). If the number of accumulated events is less than the prescale value the process returns to box 150 to check for any recurrence of the start event. Each time the counter mantissa is incremented the control and auto prescale logic will check for a mantissa overflow (158). If no overflow has occurred the process returns to box 150 to check for any recurrence of the start event. If an overflow has occurred, the counter exponent is incremented and the counter mantissa is set to the overflow reset value (160). After updating the event counter, the process again returns to box 150 to check for any recurrence of the start event.

The present invention accordingly possesses many advantages over existing binary or prescaled counters. In particular the invention significantly reduces the number of interface bits required to support very large count ranges, which in turn reduces the hardware cost of the event counter and threshold registers, and decreases the save/restore time required for context changes. The hardware-implemented auto prescaling further eliminates any need for software to determine prescale values. The invention retains high accuracy at very large event counts, and provides exact accuracy within a count range of zero through the maximum mantissa value (e.g., 128). The invention also allows for very efficient methods of converting counter values to actual values (either in hardware or in software). The invention lends great flexibility to the designer by supporting an arbitrary count range or percentage accuracy, depending on the base value and the number of bits in the exponent and mantissa.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of counting events in an electronic device, comprising:
    receiving a signal which indicates when a particular event of the electronic device occurs;
    incrementing an event counter each time a variable number of the particular events have occurred, wherein said incrementing increments a count mantissa of the event counter; and
    automatically increasing the variable number as a total count of the particular events increases, wherein the variable number increases geometrically each time the count mantissa overflows as a result of said incrementing.

2. The method of claim 1 wherein:
    a count exponent of the event counter is incremented each time the count mantissa overflows; and
    the variable number is a prescale value which is equal to a counter base raised to a power of a current value of the count exponent.

3. The method of claim 2, further comprising programmably setting the counter base.

4. The method of claim 2, further comprising setting the count mantissa to a transitional value each time the count mantissa overflows as a result of said incrementing, wherein the transitional value is equal to an overflow value for the count mantissa divided by the counter base.

5. The method of claim 1, further comprising:
    selecting the particular event, a start event, and an end event from among a plurality of events of the electronic device;
    resetting the event counter each time the start event is detected; and
    recording a count value of the event counter when the end event is detected.

6. The method of claim 1, further comprising:
    storing a threshold value;
    comparing the threshold value to a current count value of the event counter; and
    signaling when the current count value exceeds the threshold value.

7. An event counter for an integrated circuit device, comprising:
    an event counter register which contains a current count for a particular event of the integrated circuit device, said event counter register including a count mantissa; and
    control logic which increments said count mantissa each time a variable number of the particular events have occurred, and automatically increases the variable number as a total count of the particular events increases, wherein the variable number increases geometrically each time said count mantissa overflows.

8. The event counter of claim 7 wherein:
    said event counter register includes a count exponent;
    said control logic increments said count exponent each time said count mantissa overflows; and
    the variable number is a prescale value which is equal to a counter base raised to a power of a current value of said count exponent.

9. The event counter of claim 8, further comprising a control register which programmably stores the counter base.

10. The event counter of claim 8 wherein said control logic sets said count mantissa to a transitional value each time said count mantissa overflows, the transitional value being equal to an overflow value for said count mantissa divided by the counter base.

11. The event counter of claim 7, further comprising a control register which programmably stores identifiers for the particular event, for a start event of the electronic device, and for an end event of the electronic device, and wherein said control logic resets the event counter register each time the start event is detected, and signals when the end event is detected.

12. The event counter of claim 7, further comprising:
    a threshold register which stores a threshold value; and
    a comparator which signals when a current count value of said event counter register exceeds the threshold value.

13. In a computer system having a plurality of integrated circuit devices including one or more processors, one or more memory devices, and one or more input/output adaptor devices, the improvement comprising:

an event counter which counts a particular event for one of the integrated circuit devices using control logic which increments an event counter register each time a variable number of the particular events have occurred and automatically increases the variable number as a total count of the particular events increases, wherein said event counter register includes a count mantissa, said control logic increments said count mantissa each time the variable number of the particular events have occurred, and the variable number increases geometrically each time said count mantissa overflows; and a software monitor which writes one or more programmable inputs to said event counter and reads a current value of the event counter register.

14. The computer system of claim 13 wherein:

said event counter register includes a count exponent;

said control logic increments said count exponent each time said count mantissa overflows; and the variable number is a prescale value which is equal to a counter base raised to a power of a current value of said count exponent.

15. The computer system of claim 14 wherein said software monitor programmably stores the counter base in a control register of said event counter.

16. The computer system of claim 14 wherein said control logic sets said count mantissa to a transitional value each time said count mantissa overflows, the transitional value being equal to an overflow value for said count mantissa divided by the counter base.

17. The computer system of claim 13 wherein said software monitor programmably stores in a control register of said event counter identifiers for the particular event, for a start event of the one integrated circuit device, and for an end event of the one integrated circuit device, and wherein said control logic resets the event counter register each time the start event is detected, and signals said software monitor when the end event is detected.

18. The computer system of claim 13 wherein said event counter is located on the one integrated circuit device which is one of said processors.

19. A computer program product comprising:

a computer-readable storage medium; and program instructions residing on said storage medium for counting events in an integrated circuit device of a computer system wherein:

said program instructions write programmable input values to a control register of an event counter of the integrated circuit device, the programmable input values including a counter base, a start event, a counted event, and an end event, the counter base is used to geometrically increase a prescale value for an event counter register of the event counter as a total count of the counted events increases, the start event resets the event counter register, and said program instructions read a count value from the event counter register when the end event is detected.

20. The computer program product of claim 19, wherein said program instructions further write a threshold value to a threshold register of the event counter and monitor when the threshold value is exceeded by a current value of the event counter register.

21. The computer program product of claim 19 wherein:

the event counter register includes a 3-bit counter exponent and a 7-bit counter mantissa; and said program instructions write a value of 4 as the counter base.

* * * * *